United States Patent
Wang et al.

[11] Patent Number: 5,774,306
[45] Date of Patent: Jun. 30, 1998

[54] MULTI-CHANNEL, HIGH SPEED, TAPE HEAD CONTOUR

[75] Inventors: Jianmin Wang; Mark Troutman, both of Londonderry, United Kingdom

[73] Assignee: Seagate Technology, Inc., Scotts Valley, Calif.

[21] Appl. No.: 783,570

[22] Filed: Jan. 15, 1997

Related U.S. Application Data

[60] Provisional application No. 60/030,580 Nov. 12, 1996.

[51] Int. Cl.[6] ........................................... G11B 5/22
[52] U.S. Cl. ................................................. 360/104
[58] Field of Search ................................... 360/122, 104

[56] References Cited

U.S. PATENT DOCUMENTS

| | | | |
|---|---|---|---|
| 3,797,032 | 3/1974 | Kelley | 360/119 |
| 4,123,791 | 10/1978 | Rotter et al. | 360/122 X |
| 4,589,043 | 5/1986 | Grundtner | 360/122 X |
| 4,695,909 | 9/1987 | Momata et al. | 360/122 |
| 4,888,657 | 12/1989 | Lacey et al. | 360/122 |
| 4,956,737 | 9/1990 | Brock | 360/122 |
| 5,034,838 | 7/1991 | Brock et al. | 360/122 |
| 5,055,959 | 10/1991 | Saliba | 360/122 |
| 5,307,227 | 4/1994 | Okada et al. | 360/122 |
| 5,475,553 | 12/1995 | Saliba | 360/122 |
| 5,543,990 | 8/1996 | Mizoh et al. | 360/122 |

*Primary Examiner*—John H. Wolff
*Attorney, Agent, or Firm*—Westman, Champlin & Kelly, P.A.

[57] ABSTRACT

A magnetic tape head includes a body having a leading edge, a trailing edge and first and second side edges. A raised leading rail, a raised trailing rail and a raised center rail are positioned on the body and extend between the first and second side edges to form a head-to-tape interface. The raised center rail is positioned between the raised leading rail and the raised trailing rail. The raised center rail carries a transducer and has first and second longitudinal slots disposed about the transducer. The first and second slots form relieved surfaces which are recessed from the head-to-tape interface and raised from the body for reducing air bearing surface area around the transducer and causing the transducer to virtually protrude from the head-to-tape interface.

22 Claims, 5 Drawing Sheets

MULTI-CHANNEL, HIGH SPEED, TAPE HEAD CONTOUR

CROSS-REFERENCE TO RELATED APPLICATION

This application claims priority from U.S. Provisional Application Ser. No. 60/030,580, filed Nov. 12, 1996 abandoned.

BACKGROUND OF THE INVENTION

The present invention relates to magnetic tape drives and, more particularly, to a magnetic tape head having a contour for multi-channel, high speed recording.

Magnetic tape drives include a recording head which carries a transducer for reading information from and writing information to a magnetic tape as the tape passes over the head. The recording head is positioned between a pair of guide rollers which guide the tape over the head. The recording head is typically offset from the guide rollers to cause the tape to wrap onto the head. The amount of offset is referred to as a penetration distance.

High-density, high-data rate magnetic recording requires a high relative speed between the tape and the head, a large number of channels on the tape and a small tape thickness. At the same time, the tape should remain in close and stable proximity to the recording head for reliable recording. The performance of the head-to-tape interface is a function of the shape or contour of the head and how the tape wraps onto the head.

An effort to evaluate various head contours for use in digital magnetic tape drives started in the early 1950's and is still proceeding to date. A "scrape" style contour has a sharp leading edge which scrapes air away from the tape surface as the tape passes over the head to reduce an air bearing effect developed on the head surface which would otherwise force the tape away from the head. A scrape style contour therefore produces a stable head-to-tape interface but has a high contact pressure compared with other types of contours, which increases wear. Other types of contours produce a relatively low contact pressure but do not hold spacing down between the head and tape when the tape tension is low.

The introduction of thin film magnetic heads in the 1980's dramatically reduced the dimension of the recording gap and also the overall size of the head as compared to traditional metal tape heads, which greatly increased the recording density and data rate. Thin film magnetic heads also simplified the tape head contour since the thin film magnetic elements could be easily housed within the gap area. However, because of the high density and high data rate achieved by thin film heads, the tolerance in the contour of the head was greatly reduced.

Small deformations, such as less than half a micron, may totally degrade the head-to-tape interface and make a read or write operation impossible. Deformations can result from machining error, assembly error or wear by high speed contact of the tape, for example. Machining errors and assembly errors are functions of manufacturing quality control. Wear is a function of the contour design. Thus, there is a continuing need for magnetic tape heads having improved contours that allow the tape to maintain close and stable contact with the recording gap over various operating conditions and tolerances.

SUMMARY OF THE INVENTION

The magnetic tape head of the present invention includes a body having a leading edge, a trailing edge and first and second side edges. First, second and third raised rails are positioned on the body and extend between the first and second side edges to form a head-to-tape interface. The second raised rail is positioned between and spaced from the first and third raised rails. The second raised rail carries a transducer and has first and second longitudinal slots disposed about the transducer. The first and second longitudinal slots form relieved surfaces which are recessed from the head-to-tape interface and raised from the body.

The first and second longitudinal slots make the transducer virtually protrude from the head-to-tape interface and reduce the air bearing surface area around the transducer to keep the tape closer to the transducer as the tape travels across the head, especially at low tension. In one embodiment, the relieved surfaces are recessed from the head-to-tape interface 0.0003 to 0.0005 inches.

DETAILED DESCRIPTION OF THE PREFERRED EMBODIMENTS

Figure 1:
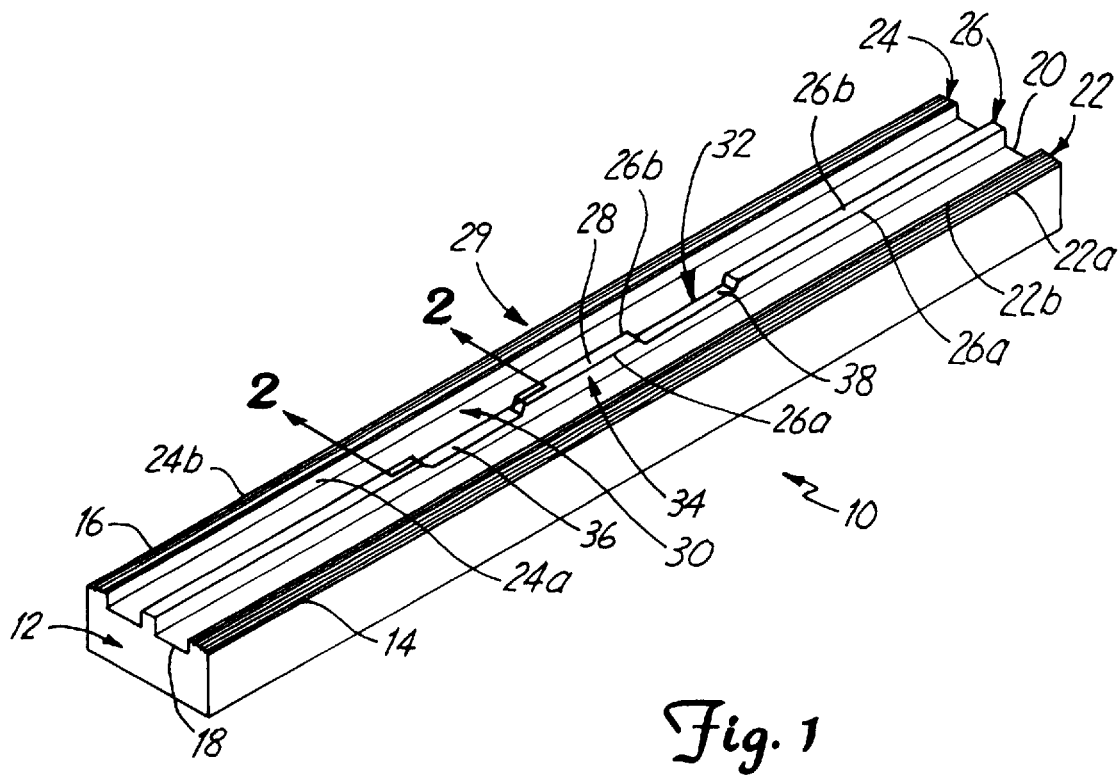
FIG. 1 is a perspective view of a magnetic tape head according to the present invention.

The magnetic tape head of the present invention has a contour which maintains a constant, low head-to-tape spacing throughout the tape tension range, especially at low tension. FIG. 1 is a perspective view of a magnetic tape head according to the present invention. Magnetic tape head 10 includes a body 12 having a leading edge 14, a trailing edge 16 and side edges 18 and 20. A pair of raised, elongated leading and trailing rails 22 and 24 extend along leading and trailing edges 14 and 16, respectively, between side edge 18 and side edge 20. Leading rail 22 has a leading edge 22a and a trailing edge 22b. Trailing rail 24 has a leading edge 24a and a trailing edge 24b.

A raised, elongated center rail 26 is disposed between leading and trailing rails 22 and 24 and extends between side edge 18 and side edge 20. Center rail 26 has a leading edge 26a and a trailing edge 26b. Center rail 26 carries a transducer 28 at a midpoint between side edges 18 and 20. Transducer 28 communicates with a magnetic tape (not shown) as the tape passes over head 10 along a head-to-tape interface 29 defined by the upper surfaces of rails 22, 24 and 26. The magnetic tape can pass from leading edge 14 to trailing edge 16 or from trailing edge 16 to leading edge 14.

The terms "leading" and "trailing" used in the specification and the claims are interchangeable. The leading and trailing edges 26a and 26b of center rail 26 scrape air from the tape as the tape passes over the center rail to reduce the air bearing effect generated on the center rail.

Head 10 can have any desired length between side edges 18 and 20. The desired length of head 10 is primarily a function of the width of the tape with which the head will be used. For example, for an 8 millimeter tape width, head 10 may have a length of 16 millimeters which allows the head to be shifted laterally with respect to the tape as transducer 28 accesses various tracks on the tape. Rails 22, 24 and 26 can extend the entire length of the head, as shown in FIG. 1, or can extend only a portion of the length.

Center rail 26 further includes a pair of shallow longitudinal slots 30 and 32 which are positioned on either side transducer 28 and define a raised center island 34 within center rail 26. Slots 30 and 32 form relieved surfaces 36 and 38 which are recessed from the upper surface of center island 34 and are raised from body 12. Slots 30 and 32 cause transducer 28 on center island 34 to virtually protrude from head-to-tape interface 29 and reduce the air bearing surface area around transducer 28. The reduction of the air bearing surface area and the scraping of edges 26a and 26b together maintain the tape closer to the recording gap of the transducer.

Figure 2:
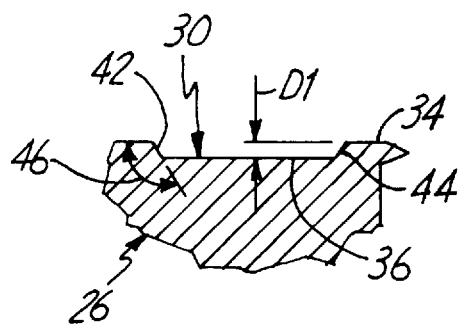
FIG. 2 is an enlarged sectional view of a longitudinal slot in the magnetic tape head taken along lines 2—2 of FIG. 1.

FIG. 2 is an enlarged sectional view of slot 30 taken along lines 2—2 of FIG. 1. The preferred depth of slots 30 and 32 is a function of various physical parameters, such as the tape tension, tape speed, tape thickness, wrap angle and penetration distance. Slots 30 and 32 should be sized to reduce the air bearing surface area around transducer 28 without damaging the magnetic tape. If slots 30 and 32 are too deep, the tape may fall into the slot and become damaged. If slots 30 and 32 are too shallow, the slots may still function as air bearing surfaces which causes the tape to lift from the transducer. In a preferred embodiment, slots 30 and 32 are recessed from the head-to-tape interface 0.0003 to 0.0005 inches, as shown by distance D1. Slots 30 and 32 also preferably have sloping side walls 42 and 44 which extend from relieved surfaces 36 and 38 to the upper surface of center rail 26. In one embodiment, side walls 42 and 44 extend at an angle 46 which is approximately 120 degrees with respect to the upper surface of center rail 26.

Figure 3:
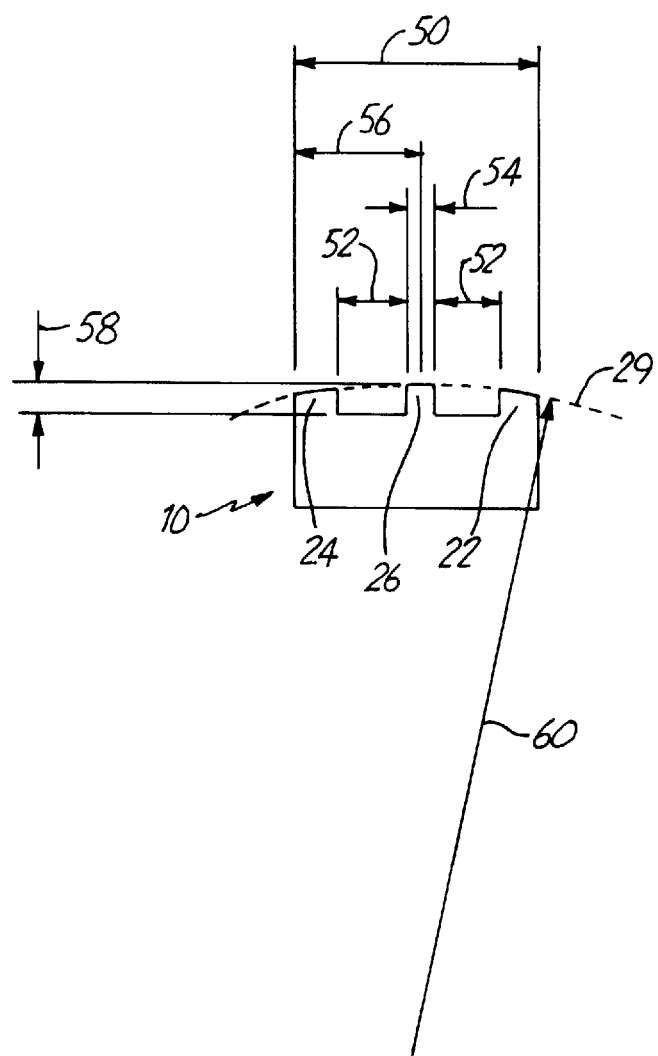
FIG. 3 is an end view of the magnetic tape head shown in FIG. 1.

FIG. 3 is an end view of head 10, showing the various dimensions of the head according to one embodiment of the present invention. The dimensions are optimized for use with a miniature data cartridge having a tape speed of 120 inches per second, a tape tension of 0.5 to 3.0 ounces and a tape elongation of 0.005 to 0.04 inches between the guide rollers. Head 10 has a width 50 which is preferably 0.0904 to 0.0944 inches. Leading and trailing rails 22 and 24 are spaced from center rail 26 by distances 52 which are preferably 0.025 to 0.026 inches. Center rail 26 has width 54 which is preferably 0.009 to 0.011 inches. The midpoint of center rail 26 is spaced from leading and trailing edges 14 and 16 a distance 54 which is preferably 0.0452 to 0.0472 inches. Center rail 26 has a height 58 measured from body 12 which is preferably 0.012 to 0.014 inches.

The upper surfaces of rails 22, 24 and 26, which form head-to-tape interface 29, preferably have a relatively low radius of curvature 60. In one embodiment, radius of curvature 60 is 0.241 to 0.249 inches. It has been found that the radius of curvature should be formed as accurately as possible for a specific configuration to keep the head-to-tape spacing constant within the tape tension range. The radius of curvature was optimized for the given tape speed, tension, thickness and final tape lapping process using a one-dimensional simulation program for tape head development which makes calculations based on the Reynold's equation and beam bending equations. Different operating parameters result in different optimal radiuses of curvature.

Figure 4:
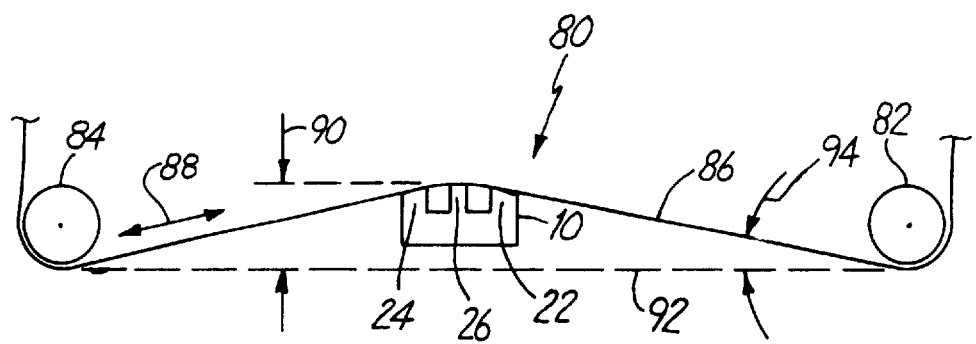
FIG. 4 is schematic representation of a tape drive apparatus in accordance with the present invention.

FIG. 4 is schematic representation of a tape drive apparatus in accordance with the present invention. Tape drive apparatus 80 includes magnetic tape head 10, guide rollers 82 and 84 and magnetic tape 86. Head 10 is positioned between guide rollers 82 and 84. Magnetic tape 86 moves in the directions indicated by arrow 88 along a tape travel path. The tape travel path extends under guide roller 82, over head 10 and then under guide roller 84. Head 10 is offset from guide rollers 82 and 84 by a penetration distance 90. Penetration distance 90 is measured from a peak of head 10 and a reference line 92 which is tangent to the bottom edges of guide rollers 82 and 84. The penetration distance 90 determines a tape wrap angle 94 between the leading edge of head 10 and guide roller 82 and between the trailing edge of head 10 and guide roller 84. In the embodiment described with reference to FIG. 3, tape wrap angle 94 is preferably 9–11 degrees on both sides of head 10.

The structure of head 10 has several advantages. Separating the leading and trailing rails 22 and 24 from center rail 26 provides vibration damping for the tape during start and stop operation and isolates the transducer on center rail 26 from disturbances generated by other tape path components such as rollers, guides and tape reels. The space between leading and trailing rails 22 and 24 reduces the contact pressure on center rail 26 by providing a small wrap angle over center rail 26. The space between leading rail 22 and center rail 26 also allows the leading edge of center rail 26 to maintain a "scrape" style contour which scrapes air away from the tape surface as tape 86 passes over center rail 26 despite changes in the wrap angle on either side of head 10.

Figure 5:
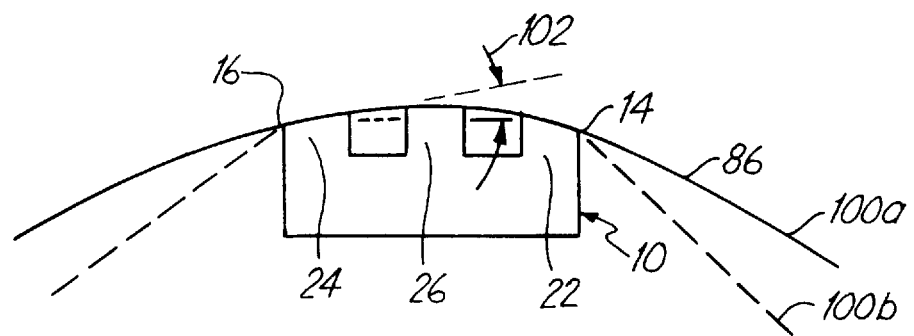
FIG. 5 is an enlarged fragmentary view of the tape drive shown in FIG. 4 which illustrates a tape wrap angle at two head penetration distances.

Separating the leading and trailing rails 22 and 24 rails from center rail 26 also provides control over the degree of tape wrap around center rail 26 since the wrap angle on center rail 26 remains constant with variations in the penetration distance 90 during assembly or performance. FIG. 5 is a greatly exaggerated fragmentary view of head 10 which illustrates the tape wrap angle at two penetration distances. As the penetration distance increases, tape 86 moves from position 100a to position 100b (shown in phantom) which causes the tape wrap angle at leading edge 14 and trailing edge 16 to increase. However, tape 86 has a constant wrap angle 102 between trailing rail 24 and center rail 26 due to the gap between the rails. The wrap angle between leading rail 22 and center rail 26 also remains constant. The longitudinal slots (shown in FIGS. 1 and 2) in center rail 26 further reduce the air bearing surface area around the transducer and make the transducer virtually protrude from the head, which maintains the tape even closer to the transducer. These advantages provide a stable head-to-tape interface at the transducer for reliable high-density recording at very high data rates.

Figure 6:
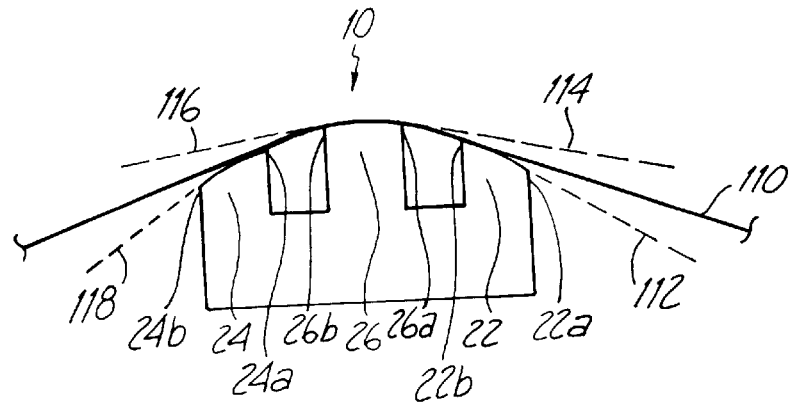
FIG. 6 is an exaggerated side view of the magnetic tape head shown in FIG. 1 which illustrates a preferred tape path over the head-to-tape interface.

FIG. 6 is an exaggerated side view of head 10 which illustrates a preferred tape path over the head-to-tape interface. The dimensions of raised rails 22, 24 and 26, the penetration distance of head 10 and the wrap angle of the tape over head 10 are selected such that the head-to-tape interface along leading and trailing rails 22 and 24 has a non-scrape style contour and the head-to-tape interface along center rail 26 has a scrape style contour. As shown in FIG. 6, the tape travels over head 10 along a tape path 110. The head-to-tape interface of head 10 has a tangent line 112 at leading edge 22a of leading rail 22, a tangent line 114 at leading edge 26a of center rail 26, a tangent line 116 at trailing edge 26b of center rail 26 and a tangent line 118 at trailing edge 24b of trailing rail 24. Tape path 110 falls above tangent lines 112 and 118 at leading edge 22a of rail 22 and trailing edge 24b of rail 24, with respect to the body of head 10. This creates a non-scrape style contour for rails 22 and 24 which reduces the wear on the tape as the tape passes over rails 22 and 24.

However, tape path 110 falls below tangent lines 114 and 116 between trailing edge 22b and leading edge 26a and between trailing edge 26b and leading edge 24a, with respect to the body of head 10. This creates a scrape style contour for center rail 26 which minimizes the air bearing effect generated on center rail 26. The scrape style contour of center rail 26, in combination with the longitudinal slots in center rail 26, minimizes the spacing between the tape and the transducer carried by center rail 26.

Figure 7:
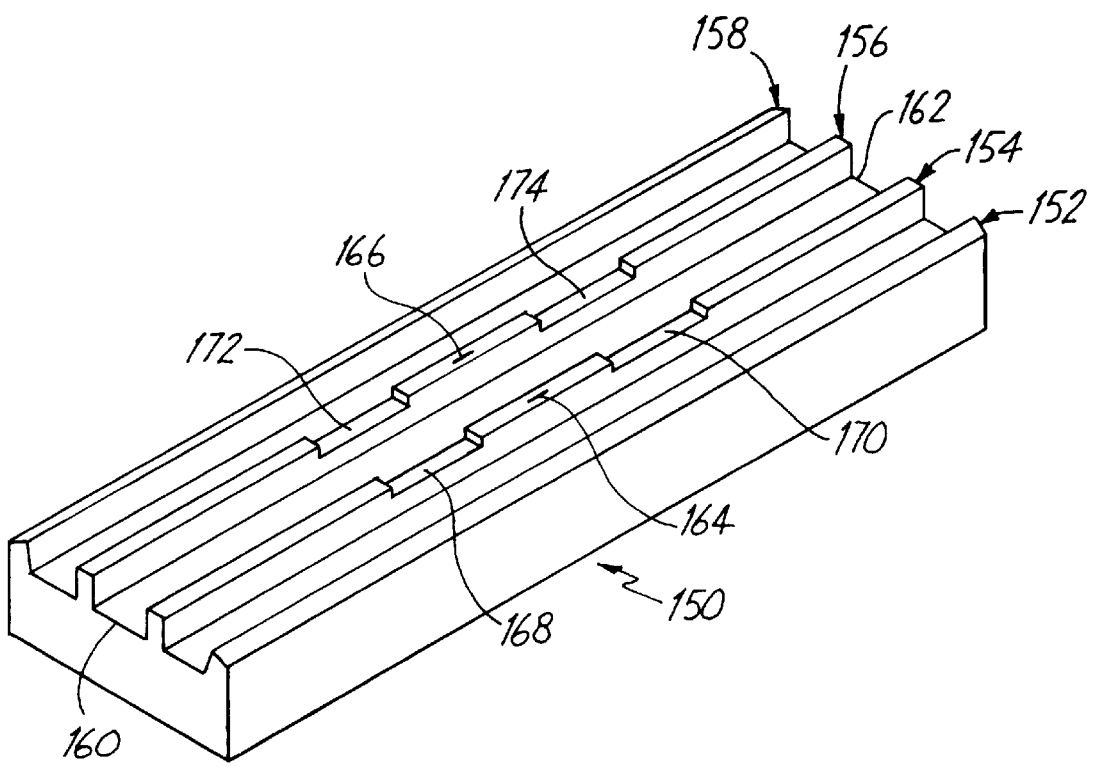
FIG. 7 is a perspective view of a magnetic tape head having two transducers carried by two raised center rails according to an alternative embodiment of the present invention.

FIG. 7 is a perspective view of a magnetic tape head having a second transducer carried by a second raised rail according to an alternative embodiment of the present invention. Magnetic tape head 150 includes raised elongated rails 152, 154, 156 and 158 which extend between side edges 160 and 162 of head 150. Rails 154 and 156 each carry a transducer 164 and 166, respectively, for communicating with a magnetic tape (not shown) as the tape travels over head 150. Each rail 154 and 156 has a pair of longitudinal slots 168/170 and 172/174 which are disposed about transducers 164 and 166, respectively. Longitudinal slots 168/170 and 172/174 are similar to the longitudinal slots shown in FIGS. 1 and 2.

Figure 8:
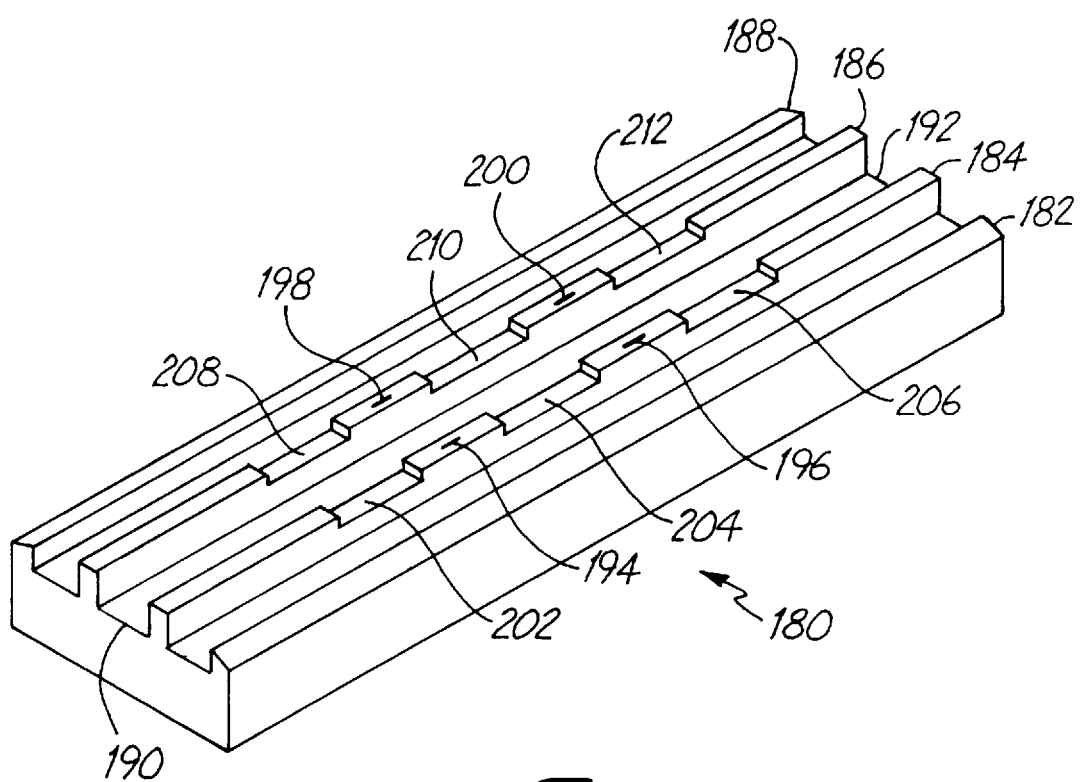
FIG. 8 is a perspective view of a magnetic tape head having four transducers carried by two raised center rails according to another alternative embodiment of the present invention.

FIG. 8 is a perspective view of a magnetic tape head having four transducers carried by two raised center rails according to an alternative embodiment of the present invention. Magnetic tape head 180 includes raised elongated rails 182, 184, 186 and 188 which extend between side edges 190 and 192 of head 180. Rail 184 carries transducers 194 and 196. Rail 186 carries transducers 198 and 200. Rail 184 has longitudinal slots 202, 204 and 206 which are disposed about transducers 194 and 196. Rail 186 has longitudinal slots 208, 210 and 212 which are disposed about transducers 198 and 200. Longitudinal slots 202, 204, 206, 208, 210 and 212 are similar to the longitudinal slots shown in FIGS. 1, 2 and 7.

Although the present invention has been described with reference to preferred embodiments, workers skilled in the art will recognize that changes may be made in form and detail without departing from the spirit and scope of the invention.

What is claimed is:

1. A magnetic tape head comprising:
   a body having a leading edge, a trailing edge, first and second side edges and a body surface;
   first, second and third raised rails extending from the body surface, between the first and second side edges, and forming a head-to-tape interface, wherein the second raised rail is disposed between and spaced from the first and third raised rails;
   a transducer carried by the second raised rail; and
   first and second longitudinal slots in the second raised rail which are disposed about the transducer and which form relieved surfaces which are recessed from the head-to-tape interface.

2. The magnetic tape head of claim 1 wherein the relieved surfaces are positioned between the head-to-tape interface and the body surface.

3. The magnetic tape head of claim 1 wherein the relieved surfaces are recessed from the head-to-tape interface 0.0003 to 0.0005 inches.

4. The magnetic tape head of claim 1 wherein each slot has first and second side walls which extend from the relieved surface to the head-to-tape interface at an oblique angle with respect to the head-to-tape interface.

5. The magnetic tape head of claim 1 wherein the body has a width measured from the leading edge to the trailing edge of 0.0904 to 0.0944 inches.

6. The magnetic tape head of claim 1 wherein the first and third raised rails are spaced from the second raised rail 0.025 to 0.026 inches.

7. The magnetic tape head of claim 1 wherein the second raised rail has a width measured between the leading edge and the trailing edge of 0.009 to 0.011 inches.

8. The magnetic tape head of claim 1 wherein the second raised rail is spaced from the body surface 0.012 to 0.014 inches.

9. The magnetic tape head of claim 1 wherein the head-to-tape interface across the first, second and third raised rails is a curved surface having a radius of curvature of 0.241 to 0.249 inches.

10. The magnetic tape head of claim 1 and further comprising:
    a further transducer carried by the second rail; and
    a third longitudinal slot in the second raised rail, wherein the second and third longitudinal slots are disposed about the further transducer.

11. The magnetic tape head of claim 1 and further comprising:
    a fourth raised rail extending from the body surface, between the second and third raised rails;
    a further transducer carried by the fourth raised rail; and
    third and fourth longitudinal slots in the fourth raised rail which are disposed about the further transducer and which form relieved surfaces which are recessed from the head-to-tape interface.

12. The magnetic tape head of claim 1 wherein the first and third raised rails each have first and second ends and maintain a constant height along a cross section of the rail taken from the first end to the second end.

13. A magnetic tape apparatus comprising:
    first and second guide rollers which are separated from one another;
    a head positioned between the first and second guide rollers and comprising:
        a body having first and second side edges and a body surface;
        first, second and third raised rails extending from the body surface, between the first and second side edges, and forming a head-to-tape interface, wherein the second raised rail is disposed between and spaced from the first and third raised rails and each raised rail has leading and trailing edges;
        a transducer carried by the second raised rail; and
        first and second longitudinal slots formed in the second raised rail which are disposed about the transducer and which form relieved surfaces which are recessed from the head-to-tape interface; and
    a tape path extending along the first guide roller, over the head-to-tape interface in a direction transverse to the first, second and third raised rails, from the leading edge of the first raised rail to the trailing edge of the third raised rail, and along the second guide roller.

14. The magnetic tape apparatus of claim 13 wherein the relieved surfaces are positioned between the head-to-tape interface and the body surface.

15. The magnetic tape apparatus of claim 13 wherein the relieved surfaces are recessed from the head-to-tape interface 0.0003 to 0.0005 inches.

16. The magnetic tape apparatus of claim 13 wherein each slot has first and second side walls which extend from the relieved surface to the head-to-tape interface at an oblique angle with respect to the head-to-tape interface.

17. The magnetic tape apparatus of claim 13 and further comprising a reference line which is tangent to the first and second guide rollers at a first side of the guide rollers, wherein:

the head is offset from the reference line in a direction away from the first side of the guide rollers such that the tape path between the first guide roller and the head and between the second guide roller and the head has a wrap angle of 9 to 11 degrees with respect to the reference line.

18. The magnetic tape apparatus of claim 13 wherein the tape path at the leading edge of the first raised rail is above the tangent of the head-to-tape interface at the leading edge of the first raised rail with respect to the body surface and wherein the tape path between the trailing edge of the first raised rail and the leading edge of the second raised rail is below the tangent of the head-to-tape interface at the leading edge of the second raised rail with respect to the body surface.

19. A magnetic tape head comprising:

a body having a leading edge, a trailing edge, first and second side edges and a body surface;

a raised rail, extending from the body surface, between the first and second side edges, and forming a head-to-tape interface;

a transducer carried by the raised rail; and first and second slots in the raised rail which are disposed about the transducer and which form relieved surfaces which are positioned between the head-to-tape interface and the body surface.

20. The magnetic tape head of claim 19 wherein the relieved surfaces are recessed from the head-to-tape interface 0.0003 to 0.0005 inches.

21. The magnetic tape head of claim 19 wherein each slot has first and second side walls which extend from the relieved surface to the head-to-tape interface at an oblique angle with respect to the head-to-tape interface.

22. The magnetic tape head of claim 19 wherein the head-to-tape interface is a curved surface having a radius of curvature measured between the leading edge and the trailing edge of 0.241 to 0.249 inches.

\* \* \* \* \*